US008897561B2

(12) United States Patent
Liu et al.

(10) Patent No.: US 8,897,561 B2
(45) Date of Patent: Nov. 25, 2014

(54) METHOD AND CIRCUIT FOR DETECTING DISAPPEARANCE OF LOGO PATTERN

(71) Applicant: Novatek Microelectronics Corp., Hsinchu (TW)

(72) Inventors: Yu-Shu Liu, Hsinchu (TW); Chun-Wei Chen, Taipei (TW); Chun Wang, Shanghai (CN); Wan-Hsi Hsieh, Taoyuan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 135 days.

(21) Appl. No.: 13/649,118

(22) Filed: Oct. 11, 2012

(65) Prior Publication Data

US 2013/0136357 A1    May 30, 2013

(30) Foreign Application Priority Data

Nov. 25, 2011   (TW) .............................. 100143356 A

(51) Int. Cl.
*G06K 9/00*   (2006.01)
*G06K 9/48*   (2006.01)

(52) U.S. Cl.
CPC ....................................... *G06K 9/48* (2013.01)
USPC ............................ 382/170; 382/103; 382/181

(58) Field of Classification Search
CPC ............ G06K 9/4647; G06K 9/00718; G06K 9/4652; G06K 9/48; G06K 6/3233; G06K 9/00777; G06T 5/40; G06T 2207/10016; G06T 7/2033; G06T 7/20
USPC ......... 382/103, 170, 199, 154, 165, 286, 296, 382/181; 348/142, 169, 208.4, E7.086; 356/491, 237.1; 358/451, 445, 484; 600/407, 437, 439; 601/3; 702/3
See application file for complete search history.

(56) References Cited

U.S. PATENT DOCUMENTS

| | | | | |
|---|---|---|---|---|
| 4,930,021 | A * | 5/1990 | Okada | 358/451 |
| 5,790,251 | A * | 8/1998 | Hagiwara | 356/491 |
| 6,128,578 | A * | 10/2000 | Sakaino et al. | 702/3 |
| 7,367,944 | B2 * | 5/2008 | Rosemberg et al. | 600/439 |
| 8,603,015 | B2 * | 12/2013 | Rosemberg et al. | 601/3 |

* cited by examiner

*Primary Examiner* — Anh Do
(74) *Attorney, Agent, or Firm* — Jianq Chyun IP Office

(57) ABSTRACT

Method for detecting disappearance of a pattern is used to detect whether a fixed-still pattern in dynamic displayed images disappears. Method includes analyzing a pattern characteristic parameter which represents the fixed-still pattern from each of images continuously displayed in a time sequence, It is checked whether the pattern characteristic parameter fast decreases from at least greater than a high level to at least less than a low level, as a first state transition. Sum of absolute difference (SAD) values for all of the pixels between a previous image and a current image is calculated. It is checked whether the sum of the SAD values fast increases from at least less than a low level to at least greater than a high level, as a second state transition. When the first state transition and the second state transition occur simultaneously, it is determined that the fixed-still pattern disappears in the display.

21 Claims, 4 Drawing Sheets

METHOD AND CIRCUIT FOR DETECTING DISAPPEARANCE OF LOGO PATTERN

CROSS-REFERENCE TO RELATED APPLICATION

This application claims the priority benefit of Taiwan application serial no. 100143356, filed on Nov. 25, 2011. The entirety of the above-mentioned patent application is hereby incorporated by reference herein and made a part of this specification.

BACKGROUND OF THE INVENTION

1. Field of the Invention

The present invention generally relates to an image processing technology, in particular, relates to a technology of detecting disappearance of a pattern.

2. Description of Related Art

Dynamic image display indicates displaying multiple images at a desired frequency. The display content of the images changes over time to form dynamic images. Generally, the dynamic image display is for example playing back the images on a video camera or a TV set.

However, when the original dynamic image content is played back, a fixed-still pattern may be overlapped on the dynamic image content according to some requirements. The fixed-still pattern is for example a logo pattern, a channel letter or sign, or some other patterns. The fixed-still pattern usually remains in the still state for a while.

FIG. 1 is a schematic view of changing of a dynamic image content when played back. Referring to FIG. 1, an image content displayed at a time point is illustrated in the upper figure. The content of the image 100 for example includes an object 102 and a fixed-still pattern 104. The fixed-still pattern 104 is e.g. a logo that represents the image content and is located at a fixed position in the still state. In the lower figure of FIG. 1, the next display image is illustrated. Here, the object 102 moves to another position, but the fixed-still pattern 104 remains at the same position.

In one circumstance of the sudden disappearance of the fixed-still pattern 104, the fixed-still pattern 104 is set to be not displayed any more. However, in another circumstance, the fixed-still pattern 104 disappears suddenly for example due to noises or instability of the display content or the like. The sudden disappearance of the fixed-still pattern 104 may result in judder of the fixed-still pattern 104.

FIG. 2 is a schematic view of changing of a dynamic image content when played back. The upper figure of FIG. 2 is identical to that of FIG. 1. When the next image is displayed as shown in the lower figure of FIG. 2, the fixed-still pattern 104 disappears suddenly.

In another similar circumstance, the fixed-still pattern 104 may move to cause the judder surrounding the fixed-still pattern 104, which may result in the blocky of the fixed-still pattern 104.

Therefore, the sudden disappearance of the fixed-still pattern needs to be detected to avoid the judder of the fixed-still pattern.

SUMMARY OF THE INVENTION

The present invention is directed to a method for detecting disappearance of a pattern, which is used to detect whether a fixed-still pattern in dynamic displayed images disappears, so as to alleviate the phenomenon like the judder of the fixed-still pattern.

The present invention is directed to a method for detecting disappearance of a pattern, which is used to detect whether a fixed-still pattern in dynamic displayed images disappears. The method includes analyzing a pattern characteristic parameter which represents the fixed-still pattern from each of images continuously displayed in a time sequence. Then, it is checked whether the pattern characteristic parameter fast decreases from at least greater than a high level to at least less than a low level, as a first state transition. A sum of absolute difference (SAD) values for all of the pixels between a previous image and a current image is calculated. And, it is checked whether the sum of the SAD values fast increases from at least less than a low level to at least greater than a high level, as a second state transition. When the first state transition and the second state transition occur simultaneously, it is determined that the fixed-still pattern disappears in the display.

The present invention is directed to a method for detecting disappearance of a pattern, which is used to detect whether a fixed-still pattern in dynamic displayed images disappears, in which plural images are continuously displayed in a time sequence. The method for detecting disappearance of a pattern includes dividing each of the images into a plurality of blocks in a space sequence. It is detected whether the disappearance of the fixed-still pattern happens to each of the blocks currently selected for processing respectively. The method for detecting disappearance of the fixed-still pattern for each block includes analyzing a pattern characteristic parameter which represents the fixed-still pattern from the block. Then, it is checked whether the pattern characteristic parameter fast decreases from at least greater than a high level to at least less than a low level, as a first state transition. A sum of absolute difference (SAD) values for all of the pixels between a previous image and a current image in the block is calculated. And, it is checked whether the sum of the SAD values fast increases from at least less than a low level to at least greater than a high level, as a second state transition. When the first state transition and the second state transition occur simultaneously, it is determined that the fixed-still pattern disappears in the display. The above steps are carried out on each of the rest blocks to detect whether the fixed-still pattern disappears.

The present invention is directed to a circuit for detecting disappearance of a pattern, which is used to detect whether a fixed-still pattern in dynamic displayed images disappears. The circuit includes a fixed-still pattern detecting unit, for detecting whether the dynamic displayed images contain the fixed-still pattern. A fixed-still pattern disappearance detecting unit is coupled to the fixed-still pattern detecting unit to detect whether the fixed-still pattern disappears in a predetermined time. The fixed-still pattern disappearance detecting unit executes multiple functions which include analyzing a pattern characteristic parameter which represents the fixed-still pattern from each of images continuously displayed in a time sequence. Then, it is checked whether the pattern characteristic parameter fast decreases from at least greater than a high level to at least less than a low level, as a first state transition. A sum of absolute difference (SAD) values for all of the pixels between a previous image and a current image is calculated. And, it is checked whether the sum of the SAD values fast increases from at least less than a low level to at least greater than a high level, as a second state transition. When the first state transition and the second state transition occur simultaneously, it is determined that the fixed-still pattern disappears in the display.

According to an embodiment, in the method and circuit for detecting disappearance of the pattern, the pattern characteristic parameter is a boundary strength value for analysis and calculation.

According to an embodiment, in the method and circuit for detecting disappearance of the pattern, the boundary strength value is a high frequency component strength value for detecting transition from a space domain to a frequency domain.

In order to make the aforementioned features and advantages of the present invention comprehensible, embodiments are described in detail below with reference to the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
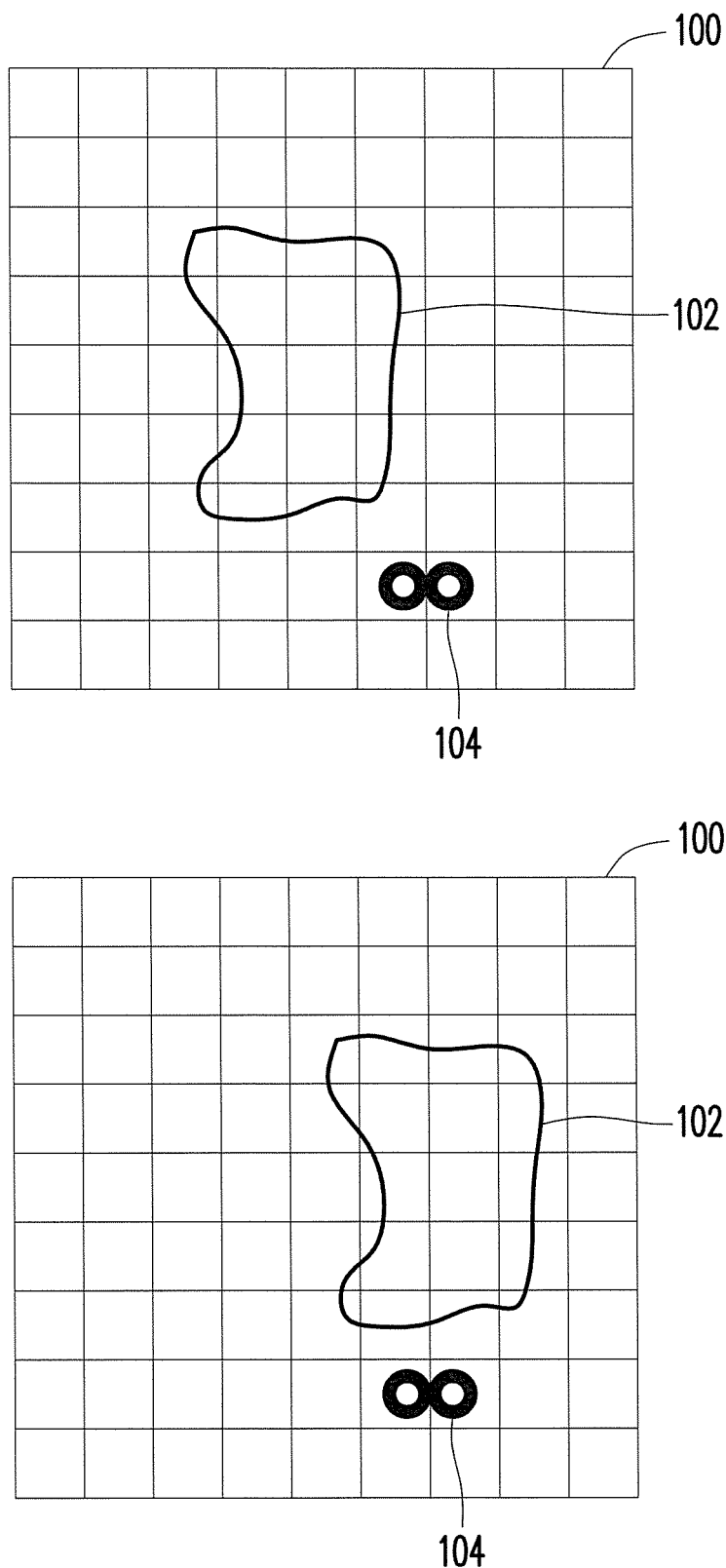
FIG. 1 is a schematic view of changing of a dynamic image content when played back in the prior art.
Figure 2:
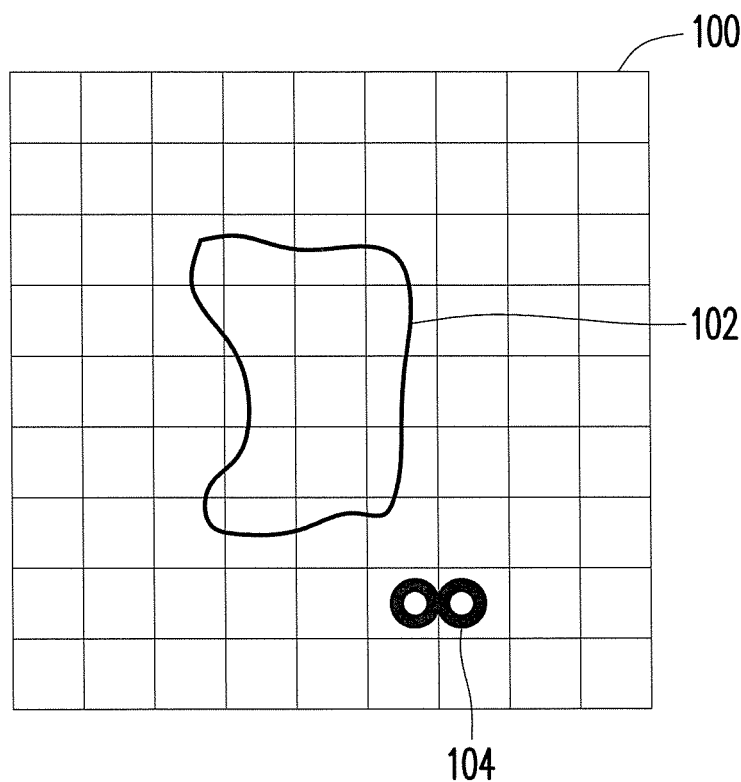
FIG. 2 is a schematic view of changing of a dynamic image content when played back in the prior art.
Figure 2:
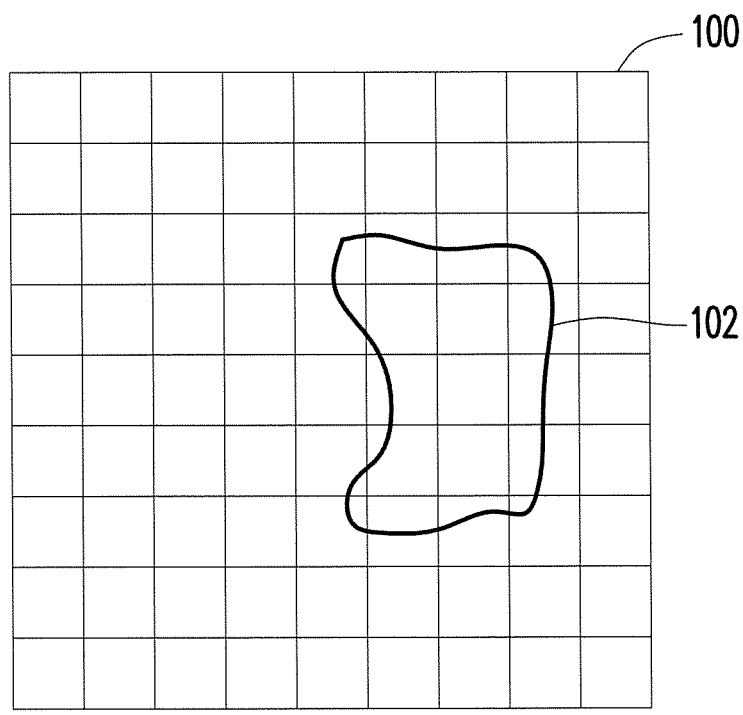

Reference will now be made in detail to the present embodiments of the invention, examples of which are illustrated in the accompanying drawings. Wherever possible, the same reference numbers are used in the drawings and the description to refer to the same or like parts.

To effectively fast detecting the disappearance of the fixed-still pattern, the present invention provides several embodiments for illustration, but the present invention is not limited to the illustrated embodiments.

For a string of the dynamic displayed images, the image frames are displayed in a time sequence of the display frequency. For the dynamic images, the shape or position of the image content usually changes over time, but the fixed-still pattern keeps still for a long period of time. For the actual displayed images, the fixed-still pattern is floated on the background dynamic image.

Figure 3:
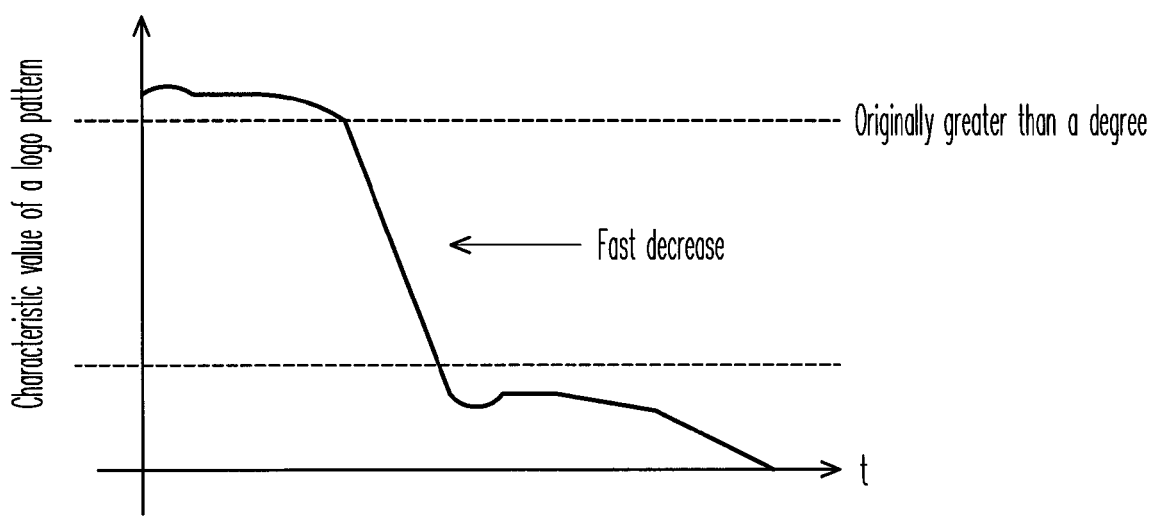
FIG. 3 is a schematic view of changing of a logo pattern characteristic parameter according to an embodiment of the present invention.

It may be determined whether the fixed-still pattern disappears suddenly according to two conditions. FIG. 3 is a schematic view of changing of a logo pattern characteristic parameter according to an embodiment of the present invention. Referring to FIG. 3, the fixed-still pattern for example is a logo pattern, which has the characteristic which represents the fixed-still pattern, for example, has a distinct boundary. The boundary of the object may be identified in the method commonly used in the field. Usually, the characteristic parameter of the fixed-still pattern contains the fixed-still pattern, so in view of changing in a time axis, when the sequentially displayed images are analyzed in the time sequence, if the displayed images contain the fixed-still pattern, the characteristic parameter remains greater than a degree, i.e. greater than a level indicated by a dash line above.

When the fixed-still pattern disappears suddenly, the characteristic parameter suddenly decreases to at least less than a low level. The sudden disappearance indicates the disappearance that happens within a few numbers of the image frames. For example, the disappearance happens within 3 image frames and even the disappearance happens within 1 image frame. In other words, the previous image frame has the fixed-still pattern, but the fixed-still pattern disappears in the next image frame.

Under the ideal conditions, when the fixed-still pattern disappears, the characteristic parameter suddenly decreases distinctly.

The characteristic parameter of the fixed-still pattern may be an analysis value that represents the characteristic and the determination method is not particularly limited. However, for an ordinary characteristic, the fixed-still pattern is characterized by a distinct still-state object boundary. For background animation images, the content changes over time in most circumstances and does not have the distinct still-state object boundary. Therefore, the characteristic parameter in FIG. 3 for example may be determined by whether the still-state object boundary is found.

In a method of finding out the object boundary, the identification of the object boundary is made directly in the space domain of the images. However, when the space domain transits to the frequency domain, an intensive object boundary is the transition to a high frequency component. Therefore, in consideration of detecting the object boundary conveniently, a low frequency component set in the frequency domain may be filtered and it is checked whether the high frequency component exists, so as to preliminarily determine whether the object boundary exists. The object is most likely generated by the fixed-still pattern.

However, if the determination is made merely based on the method illustrated in FIG. 3, the false determination may occur since the background dynamic image has the still-state object which moves suddenly to cause the decrease of the high frequency component, and the displayed images still have the fixed-still pattern. Therefore, the false determination may occur if the determination is made merely depending on the conditions of FIG. 3.

Accordingly, the present invention also provides checking another condition, i.e. checking the sum of absolute difference (SAD) values $Z_{SAD}$, which may be calculated according to formula (1):

$$Z_{SAD} = \sum_{i=1, j=1}^{blk\text{-}size} |PixelData_{i,j,pre\text{-}frame} - PixelData_{i,j,cur\text{-}frame}| \quad (1)$$

The sum of SAD values for the pixel data $PixelData_{i,j}$ at the same location between the pre-frame and the cur-frame is calculated, where the index i, j refers to the address of the pixels. In addition, an index blk-size refers to the analyzed image block. If the whole piece of image is analyzed at the same time, the index blk-size represents the whole piece of image. If the image is divided into multiple image blocks, the index blk-size refers to the sum of SAD values for each of the image blocks.

If the image is displayed in a nearly still state, the image content of the previous and current image frames does not change greatly, and the $Z_{SAD}$ value is at least less than a low level. If the images are displayed in a completely still state, the $Z_{SAD}$ value is zero or almost zero. In other words, the $Z_{SAD}$ value may reflect the degree of changing of the images.

Based on the characteristics of the $Z_{SAD}$ value, when the dynamic display contains the fixed-still pattern, the generated $Z_{SAD}$ value of this portion is zero in the ideal situation. Even if the display error actually exists, the generated $Z_{SAD}$ is still small. Therefore, in the situation that the dynamic change is not large, the $Z_{SAD}$ value remains to be at least less than a low level. If the fixed-still pattern disappears suddenly, the $Z_{SAD}$ distinctly increases.

Figure 4:
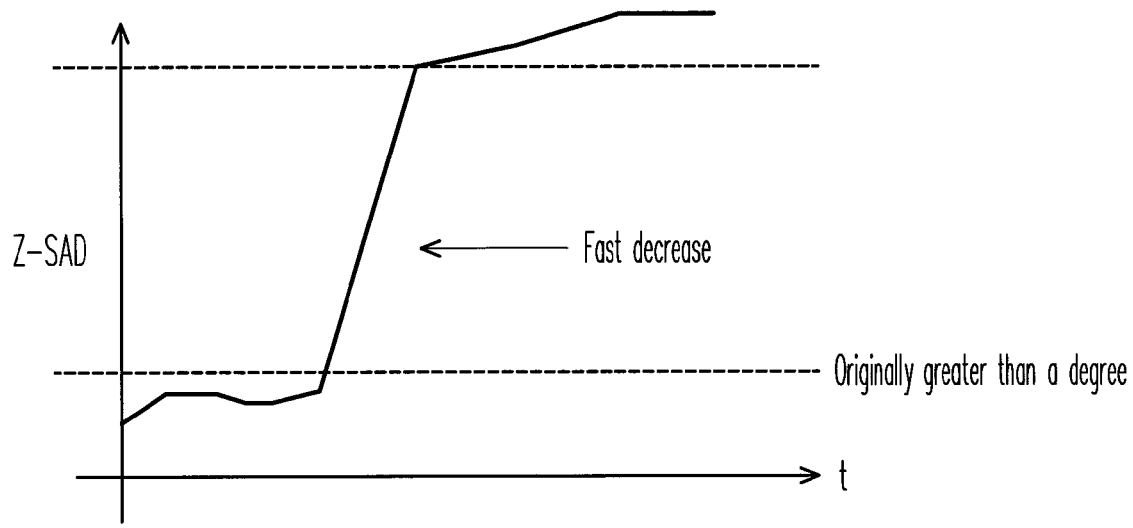
FIG. 4 is a schematic view of changing of $Z_{SAD}$ value according to an embodiment of the present invention.

FIG. 4 is a schematic view of changing of $Z_{SAD}$ value according to an embodiment of the present invention. Referring to FIG. 4, the $Z_{SAD}$ values of two adjacent image frames are calculated over time. In the situation that the whole piece of the image is regarded as the unit for calculation, if the dynamic display contains the fixed-still pattern, the $Z_{SAD}$ value remains to be at least less than a low level, i.e. the $Z_{SAD}$ value remains to be less than a degree. In the ordinary dynamic display, the $Z_{SAD}$ value does not change greatly.

When the fixed-still pattern disappears suddenly, the $Z_{SAD}$ value suddenly increases to a degree from the state originally less than the degree. Then, the changing of the $Z_{SAD}$ value remains in a small extent, but the actual value stays to be at least greater than a high level. This phenomenon is predicted to be generated by the fixed-still pattern sudden disappearance.

However, if whether the fixed-still pattern disappears suddenly is determined merely based on the changing mechanism of the $Z_{SAD}$ value in FIG. 4, in a situation of the false determination, the $Z_{SAD}$ value suddenly increases since only the background images change greatly.

Since the false determination may occur when whether the fixed-still pattern disappears suddenly is determined merely based on the single condition in FIG. 3 or FIG. 4, in order to achieve the accurate determination, the two conditions must be met at the same time, thereby improving the accuracy of determination.

When it is detected that the sudden disappearance of the fixed-still pattern occurs, the follow-up coping processes may be applied.

According to the above same determination mechanism, if the image is divided into multiple image blocks for analyzing, it is determined whether the sudden disappearance of the fixed-still pattern occurs for each image block. When multiple image blocks are analyzed, some image blocks do not contain the fixed-still pattern, and only the background dynamically changes. According to the size of the image blocks, the fixed-still pattern may cover multiple image blocks. After every block is detected sequentially, if the sudden disappearance of the fixed-still pattern occurs, it is detected that the phenomenon of the sudden disappearance of the fixed-still pattern happens to the image blocks that exceed a certain number. In other words, when it is detected that the number of the image blocks having the sudden disappearance phenomenon of the fixed-still pattern is greater than a setting value that is set according to the actual size of the fixed-still pattern, it is determined that the sudden disappearance of the fixed-still pattern occurs, and the follow-up coping processes may be applied. For example, the display of the fixed-still pattern is deleted.

Since when the analysis is made on a small-area image block, the changes of the fixed-still pattern may be detected distinctly. The number of the image blocks covered by the fixed-still pattern may be estimated from the historical statistics, so the analysis is more accurate when made based on the image blocks.

According to the above mechanism, the present invention provides a method for detecting disappearance of a pattern, which can be used to detect whether a fixed-still pattern in dynamic displayed images disappears. The method includes analyzing a pattern characteristic parameter which represents the fixed-still pattern from each of images continuously displayed in a time sequence. Then, it is checked whether the pattern characteristic parameter fast decreases from at least greater than a high level to at least less than a low level, as a first state transition. A sum of SAD values $Z_{SAD}$ of all of the pixels between a previous image and a current image is calculated. And, it is checked whether the sum of the SAD values fast increases from at least less than a low level to at least greater than a high level, as a second state transition. When the first state transition and the second state transition occur simultaneously, it is determined that the fixed-still pattern disappears in the display.

Figure 5:
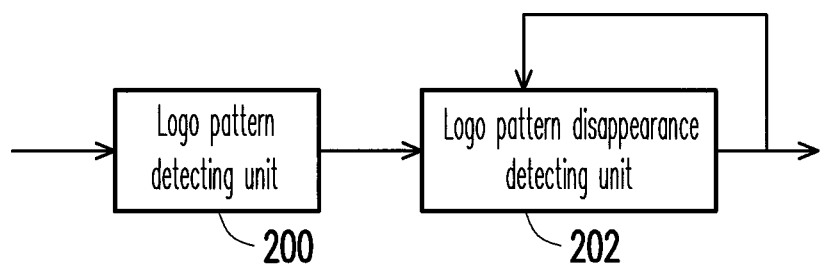
FIG. 5 is a schematic view of a circuit for detecting disappearance of a logo pattern according to an embodiment of the present invention.

Regarding the hardware processing circuit, the circuit may be divided into two units. FIG. 5 is a schematic view of a circuit for detecting disappearance of a logo pattern according to an embodiment of the present invention. Referring to FIG. 5, the circuit for detecting disappearance of a logo pattern for example includes a logo pattern detecting unit 200, for detecting whether the dynamic displayed images contain a fixed-still pattern. Here, the fixed-still pattern is for example the logo pattern. A logo pattern disappearance detecting unit 202 is coupled to the fixed-still pattern detecting unit, for detecting whether the fixed-still pattern disappears in a predetermined time. The fixed-still pattern disappearance detecting unit executes multiple functions which include analyzing a pattern characteristic parameter which represents the fixed-still pattern from each of images continuously displayed in a time sequence, Then, it is checked whether the pattern characteristic parameter fast decreases from at least greater than a high level to at least less than a low level, as a first state transition. The fixed-still pattern disappearance detecting unit 202 calculates a sum of SAD values for all of the pixels between a previous image and a current image. And, it is checked whether the sum of the SAD values fast increases from at least less than a low level to at least greater than a high level, as a second state transition. When the first state transition and the second state transition occur simultaneously, it is determined that the fixed-still pattern disappears in the display.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for detecting disappearance of a pattern, implemented in a displaying apparatus and used to detect whether a fixed-still pattern in dynamic displayed images on the displaying apparatus disappears, comprising:
analyzing a pattern characteristic parameter which represents the fixed-still pattern from each of the images continuously displayed in a time sequence and checking whether the pattern characteristic parameter fast decreases from at least greater than a high level to at least less than a low level, as a first state transition;
calculating a sum of absolute difference (SAD) values for all of the pixels at a same location of a previous image and a current image and checking whether the sum of the SAD values fast increases from at least less than the low level to at least greater than the high level, as a second state transition; and determining that the fixed-still pattern disappears in the display when the first state transition and the second state transition occur simultaneously.

2. The method for detecting disappearance of a pattern according to claim 1, wherein the pattern characteristic parameter is a boundary strength value for analysis and calculation.

3. The method for detecting disappearance of a pattern according to claim 1, wherein the boundary strength value is a high frequency component strength value for detecting transition from a space domain to a frequency domain.

4. The method for detecting disappearance of a pattern according to claim 1, wherein a historical statistic is made on the pattern characteristic parameter and a sum of the absolute difference values according to an image display time to find out whether the first state transition and the second state transition occur.

5. The method for detecting disappearance of a pattern according to claim 1, wherein the boundary strength value is a directly analyzed degree of an existing boundary of each of the images.

6. The method for detecting disappearance of a pattern according to claim 1, wherein the sum of the SAD values is a value obtained by calculating each SAD value of plural pairs of pixels at the same location of the current image and the previous image and making a sum of all the absolute difference values.

7. The method for detecting disappearance of a pattern according to claim 6, wherein the sum of the SAD values is divided by a constant.

8. The method for detecting disappearance of a pattern according to claim 1, wherein if the disappearance of the fixed-still pattern in the display exceeds a predetermined time, the fixed-still pattern is deleted.

9. The method for detecting disappearance of a pattern according to claim 1, wherein the first state transition and the second state transition fast occur between two adjacent images.

10. A method for detecting disappearance of a pattern, implemented in a displaying apparatus and used to detect whether a fixed-still pattern in dynamic displayed images on the displaying apparatus disappears, wherein plural images are continuously displayed in a time sequence, the method for detecting disappearance of a pattern comprising:
dividing each of the images into a plurality of blocks in a space sequence, wherein it is detected whether the disappearance of the fixed-still pattern happens to each of the blocks currently selected for processing respectively, comprising:
analyzing a pattern characteristic parameter which represents the fixed-still pattern in the block and checking whether the pattern characteristic parameter fast decreases from at least greater than a high level to at least less than a low level, as a first state transition;
calculating a sum of absolute difference (SAD) values for all of the pixels of a previous image and a current image in the block and checking whether the sum of the SAD values fast increases from at least less than the low level to at least greater than the high level, as a second state transition; and
when the first state transition and the second state transition occur simultaneously, determining that the fixed-still pattern disappears in the display; and
continuously carrying out the above steps on each of the rest blocks to detect whether the fixed-still pattern disappears.

11. The method for detecting disappearance of a pattern according to claim 10, wherein the pattern characteristic parameter is a boundary strength value for analysis and calculation.

12. The method for detecting disappearance of a pattern according to claim 10, wherein the boundary strength value is a high frequency component strength value for detecting transition from a space domain to a frequency domain.

13. The method for detecting disappearance of a pattern according to claim 10, wherein a historical statistic is made on the pattern characteristic parameter and the sum of the SAD values according to an image display time to find out whether the first state transition and the second state transition occur.

14. The method for detecting disappearance of a pattern according to claim 10, wherein the boundary strength value is a directly analyzed degree of an existing boundary of each of the images.

15. The method for detecting disappearance of a pattern according to claim 10, wherein the sum of the SAD values is a value obtained by calculating each SAD value of plural pairs of pixels at the same location of the current image and the previous image and making the sum of all the SAD values.

16. The method for detecting disappearance of a pattern according to claim 15, wherein the sum of the SAD values is divided by a constant.

17. The method for detecting disappearance of a pattern according to claim 10, wherein if the disappearance of the fixed-still pattern in the display exceeds a predetermined time, the fixed-still pattern is deleted.

18. The method for detecting disappearance of a pattern according to claim 10, wherein the first state transition and the second state transition fast occur between two adjacent images.

19. A circuit for detecting disappearance of a pattern, used to detect whether a fixed-still pattern in dynamic displayed images disappears, comprising:
a fixed-still pattern detecting unit, for detecting whether the dynamic displayed images contain the fixed-still pattern; and
a fixed-still pattern disappearance detecting unit, coupled to the fixed-still pattern detecting unit, for detecting whether the fixed-still pattern disappears in a predetermined time, wherein the fixed-still pattern disappearance detecting unit executes multiple functions which comprises:
analyzing a pattern characteristic parameter which represents the fixed-still pattern from each of images continuously displayed in a time sequence and checking whether the pattern characteristic parameter fast decreases from at least greater than a high level to at least less than a low level, as a first state transition;
calculating a sum of absolute difference (SAD) values for all of the pixels between a previous image and a current image and checking whether the sum of the SAD values fast increases from at least less than a low level to at least greater than a high level, as a second state transition; and
when the first state transition and the second state transition occur simultaneously, determining that the fixed-still pattern disappears in the display.

20. The circuit for detecting disappearance of a pattern according to claim 19, wherein the pattern characteristic parameter is a boundary strength value for analysis and calculation.

21. The circuit for detecting disappearance of a pattern according to claim 19, wherein the boundary strength value is a high frequency component strength value for detecting transition from a space domain to a frequency domain.

\* \* \* \* \*